United States Patent [19]

Doornink

[11] 4,190,834

[45] Feb. 26, 1980

[54] CIRCUIT AND METHOD FOR PRODUCING A FULL-SCREEN CROSS-HAIR CURSOR ON A RASTER-SCAN TYPE DISPLAY

[75] Inventor: Douglas J. Doornink, Portland, Oreg.

[73] Assignee: Tektronix, Inc., Beaverton, Oreg.

[21] Appl. No.: 951,703

[22] Filed: Oct. 16, 1978

[51] Int. Cl.[2] .................... G06F 3/14

[52] U.S. Cl. .................... 340/709; 35/12 N; 178/18; 340/725; 340/734; 343/5 EM

[58] Field of Search .................... 340/709, 710, 706, 734, 340/725; 178/18-20; 35/12 N; 358/104, 107; 343/5 EM

[56] References Cited

U.S. PATENT DOCUMENTS

| | | | |
|---|---|---|---|
| 3,076,961 | 2/1963 | Bibbero | 340/709 |
| 3,355,733 | 11/1967 | Mitchell et al. | 343/5 EM |
| 3,668,685 | 6/1972 | Horvath | 340/709 |
| 3,729,129 | 4/1973 | Fletcher et al. | 35/12 N |
| 3,778,058 | 12/1973 | Rausch | 340/725 |
| 3,793,481 | 2/1974 | Ripley et al. | 358/107 |
| 3,793,483 | 2/1974 | Bushnell | 340/725 |
| 3,883,861 | 5/1975 | Heartz | 340/709 |
| 3,909,519 | 9/1975 | Page, Jr. | 358/107 |
| 4,015,846 | 4/1977 | Runte et al. | 340/725 |
| 4,017,680 | 4/1977 | Anderson et al. | 358/107 |
| 4,028,695 | 6/1977 | Saich | 340/709 |
| 4,119,890 | 10/1978 | Kretz | 315/377 |

*Primary Examiner*—Marshall M. Curtis
*Attorney, Agent, or Firm*—Thomas J. Spence

[57] ABSTRACT

A circuit and method for receiving and sequentially decrementing the x and y coordinates of a desired cursor location so as to produce in a raster-scan display system a cross-hair cursor the component parts of which extend the full height and width of the display area.

12 Claims, 4 Drawing Figures

CIRCUIT AND METHOD FOR PRODUCING A FULL-SCREEN CROSS-HAIR CURSOR ON A RASTER-SCAN TYPE DISPLAY

BACKGROUND OF THE INVENTION

The subject matter of the present invention pertains to means for electronically generating cursors, or other visual position indicators, in a raster-scan type display system to facilitate the identification, entry, modification, or deletion of information at selected locations within a particular area of a display presentation.

The desirability and advantage of an electronically generated cursor that may be positioned within a broad area of a display presentation are well recognized to those persons familiar with the art. Normally, in a raster-scan type display system employed to display alphanumeric information, the cursor takes the form of a small underline segment that is positionable directly below a character location to identify the specific address that is to be affected. The circuitry employed to generate and position the cursor also produces electronic signals representative of the cursor location for use by other sections of the display system in identifying the selected address. In raster-scan type display systems capable of presenting graphic as well as alphanumeric information, the cursor may take other forms, for example that of a small cross, circle, or combination thereof.

The primary disadvantage of known cursor generating systems is that the small cursor symbol produced thereby is difficult to locate and position accurately when the display presentation is overly crowded. This disadvantage is particularly present in a graphics environment where the information forming the display presentation is not as ordered or uniform in appearance as that of an alphanumeric display. A second disadvantage is that symbols such as circles and small crosses are difficult to position precisely because, in the case of the circle, there is no precise indication of an exact center point, and in the case of the cross, the center point itself, although readily discernable, tends to overlay and obscure the data being identified.

Accordingly, there remains a need for means in a display system for generating a graphic cursor that is both easy to see when used in conjunction with a crowded display presentation and easy to position without obscuring the information being identified.

SUMMARY OF THE INVENTION

The present invention is directed to a circuit and method for producing a full-screen cross-hair cursor in a raster-scan type display system. More particularly, the circuit comprises first and second counter modules for receiving the x and y cordinate values, respectively, of a desired cursor location relative to a predetermined reference point on the face of the display screen, and means for updating the information stored in the counters in a manner producing full-screen cross-hair cursor. The method of the present invention includes steps directed to the manner in which the values of the cursor coordinates are updated and utilized to produce the desired cursor configuration. A special feature of the cursor thus generated, besides its large size and resultant high visibility, is that its exact center; that is, the cross-over point of its two major linear members, is left blank or transparent to any underlying information. Provision is also included for accommodating both interlaced and noninterlaced raster-scan type displays.

In operation, the counter modules are loaded with their respective x or y coordinate values and decremented at rates proportional to the raster line and field rates. Upon being decremented to zero, indicating that the electron beam forming the raster-scan display has reached a particular cursor coordinate location, each counter module produces a signal which is exclusively ORed with the signal currently being produced by the other counter module to generate a third signal that is used to modulate the electron beam in a manner describing the desired cursor. The use of the exclusive OR step in the formation of the third signal ensures that the exact center of the resultant cross-hair cursor will not be illuminated on the display screen, thereby permitting the cursor to be more accurately positioned without obscurring the information over which it is located.

It is, therefore, a principal objective of the present invention to provide a circuit and method for generating a full-screen cross-hair type cursor on the display screen of a raster-scan type display system.

It is an additional objective of the present invention to provide in a raster-scan type display system means for generating a full-screen cross-hair type cursor, the exact center of which is transparent to other information contained within the system.

The foregoing objectives, features and advantages of the present invention will be more readily understood upon consideration of the following detailed description of the invention taken in conjunction with the accompanying drawings.

DESCRIPTION OF THE PREFERRED EMBODIMENT

Figure 1:
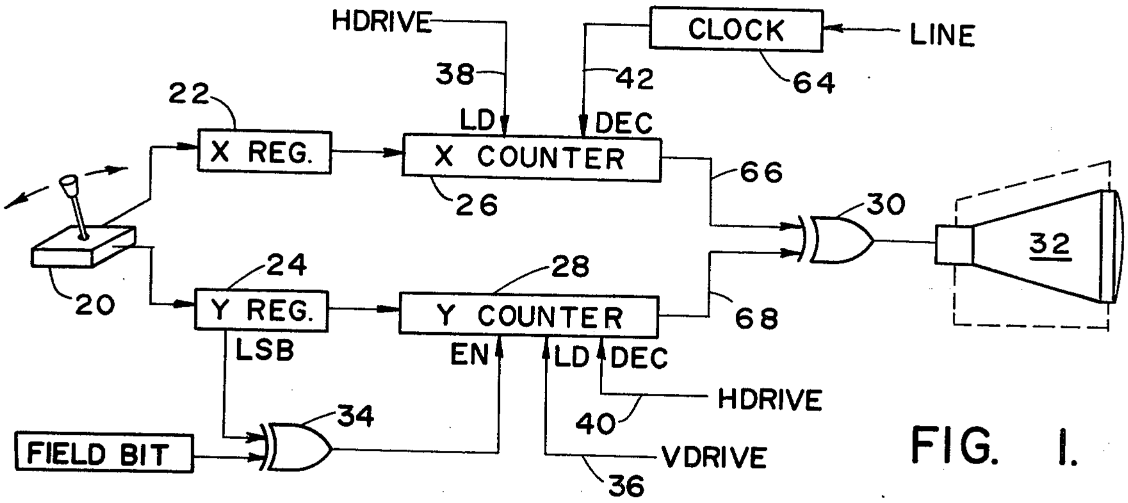
FIG. 1 is a logic level diagram of the cursor generating circuit of the present invention.

As shown in the logic level diagram of FIG. 1, the cursor generating circuit of the present invention includes a joystick 20 or other positional-type device capable of producing digital signals representative of the coordinate values in two dimensions of the desired center location of the cursor to be generated, a first register 22 for receiving and holding the digital signal corresponding to the *x* coordinate of the cursor location, a second register 24 for receiving and holding the digital signal representative of the y coordinate, a first counter module 26 for receiving and selectively decrementing the signal stored in the first register 22, a second counter module 28 for receiving and selectively decrementing the signal stored in the second register 24, an exclusive OR-gate 30 for comparing the signals produced by each of the counter modules 26 and 28 upon being decremented to zero, and a cathode ray tube (CRT) type display device 32 for producing a raster-scan type display presentation which is controlled at least partially by the signal from the OR-gate 30. Also included are a second OR-gate 34 connected between the second register 24 and the second counter module 28, and a plurality of input signal lines 36–48 the operation and significance of which are discussed in more detail below. Further included, but omitted from the diagram for clarity, are those other circuits necessary to form an operable raster-scan type display system capable of producing an image composed of a plurality of sequentially generated image frames each of which is composed of a plurality of sequentially generated, mutually parallel raster line segments. Such circuits are well known to those persons familiar with the art and need not be described further therein.

The registers 22 and 24, counter modules 26 and 28, and exclusive OR-gates 30 and 34 are conventional in nature and may be of any suitable design and construction capable of satisfying the operational requirements set forth herein. The width of the registers and counters in digital bits need be sufficient only to contain a number corresponding to the height or width of the raster screen presentation in lines or divisions, respectively. For example, with a display area comprising 480 (740 octal) raster lines of 640 (1200 octal) divisons each, register 22 and counter module 26 should each be at least ten bits wide and register 24 and counter module 28 should each be at least nine bits wide. The positional device 20, although shown as a joy-stick in FIG. 1, may be any suitable device, including a computer or processor, capable of generating the requisite digital signals.

Figure 2:
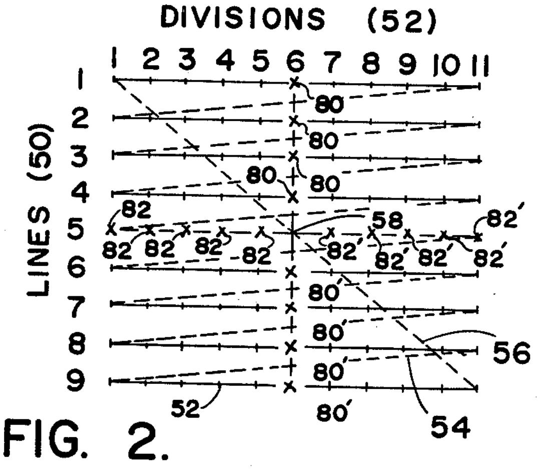
FIG. 2 is a simplified representation of a raster-scan presentation of the full-screen cross-hair cursor produced by the circuit of FIG. 1.

Referring briefly to FIG. 2, there is shown a simplified, idealized raster-scan display presentation comprising nine raster lines 50 of eleven identifiable points or time divisions 52 each. Also, shown in dotted form are the horizontal and vertical retrace paths 54 and 56 of the electron beam forming the presentation. As indicated earlier, the conventional circuitry required to produce the raster-scan presentation of FIG. 2 is omitted from the diagram of FIG. 1 for clarity, but is assumed to be present for operation of the circuit. From such circuitry are drawn in a conventional manner the digital input signals VDRIVE occuring once per vertical retrace, HDRIVE occuring once per horizontal or vertical retrace, CLOCK occuring once per line division, and others to be described more fully below. As will be understood by those persons familiar with the art, the display area shown in FIG. 2 is actually a sub-area of a larger display presentation and the vertical retrace path 56 is idealized to ignore, for example, the effect of horizontal retrace signals occuring during vertical retrace time.

In operation, with the joy-stick 20 in its central, non-deflected position, and assuming for simplicity the decimal numbering system, the registers 22 and 24 will contain the values six and five, respectively, to indicate that the cursor, defined by the small x's in FIG. 2, is to be located at the central position indicated in the figure with its cross-over or center point 58 positioned at the sixth division in a horizontal direction and at the fifth line in a vertical direction from a reference point 60 located, for example, at the upper left-hand corner of the display area. During vertical retrace time, when the electron beam forming the display presentation is being repositioned from the lower right-hand corner of the display area to its starting point at the upper left-hand corner of the area, a VDRIVE signal 70 and an HDRIVE signal 72 are produced as indicated in the timing diagram of FIG. 3 and transmitted as shown in FIG. 1 to the load terminals (LD) of the two counter modules 26 and 28, thereby causing the counter modules to receive from the two registers 22 and 24 the coordinate values of the cursor center point. (It should be noted that the timing diagram of FIG. 3 is employed to indicate primarily timing sequences and interrelationships, and is not drawn to any particular timing scale).

Figure 3:
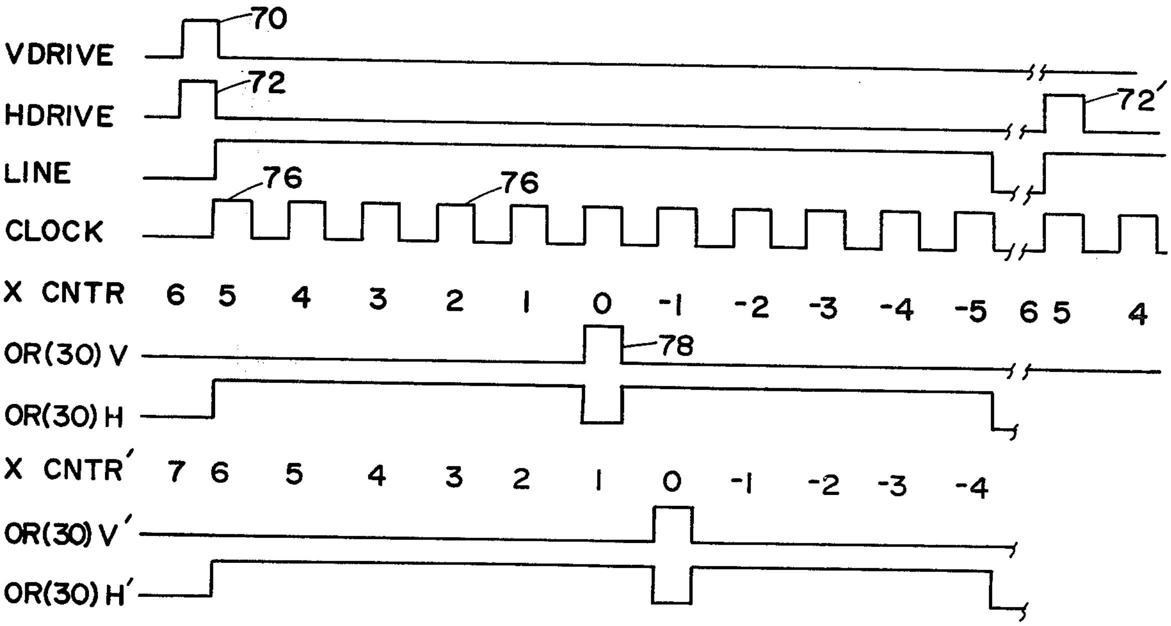
FIG. 3 is a timing diagram of selected signals present within the circuit of FIG. 1.

At a predetermined time following vertical retrace, a signal such as that labeled LINE in FIG. 3 is produced by conventional means to indicate the start of a new raster line 50. This LINE signal is transmitted to a clock module, such as 64 in FIG. 1, to initiate the production of a uniform series of CLOCK pluses 76. The CLOCK pulses 76 are, in turn, transmitted to the decrement terminal (DEC) of the counter module 26 to cause the x coordinate value previously loaded into the counter module to be decremented one digital unit per CLOCK pulse, with each CLOCK pluse coresponding to and defining a division 52 of a respective raster line 50. During the time that the x coordinate value in the counter module 26 is being decremented by the CLOCK pulses 76, the y coordinate value in the second counter module 28, which is decremented only upon receipt at its decrement terminal (DEC) of an HDRIVE signal 72, remains unchanged. As long as the values stored in the two counter modules 26 and 28 are other than zero, the signal present at their output terminals 66 and 68 will be low and the signal produced by the OR-gate 30 will also be low; the result being that no visible trace will be produced by the electron beam as it scans across the face of the cathode-ray tube 32 in a horizontal direction. (The solid lines of FIG. 2 indicate the beam path only and not the generation of a visible trace.)

Once the value stored in the counter module 26 has been decremented to zero, as indicated by the series of numbers labeled XCNTR in FIG. 3, the signal present at the output terminal 66 of the counter module will go high, be exclusively ORed with the low signal from the output terminal 68 of the counter module 28, and cause the OR-gate 30 to produce a cursor-write pulse 78 such as that shown on the line labled OR (30) V in FIG. 3. This pulse 78, in turn, causes the electron beam of the cathode-ray tube 32 to produce an illuminated spot at the position indicated by the small x labled 80 in FIG. 2. As the CLOCK signals continue to occur, the value in the counter module 26 will decremented below zero, and the signal produced by the counter module will return to and remain at its initial low state, thereby blanking again the electron beam of the cathode-ray tube 32. When the electron beam reaches the end of the raster line, the LINE signal is caused to drop and the clock module 64 ceases operation.

As the electron beam of the cathode ray tube 32 is repositioned to start a new raster line, a new HDRIVE pulse 72' is generated and the above-described process is repeated, producing a new spot 80' for each successive raster line 50 and decrementing the value stored in the counter module 28 one digital unit per line. When the value in the counter module 28 has been decremented to zero, the signal present at its output terminal 68 will go high and remain high for the entire next raster line. While this signal is high, and the signal produced by the counter module 26 is low, the signal produced by the OR-gate 30, and labeled OR(30)H in FIG. 3, will cause the electron beam of the cathode-ray tube 32 to draw a horizontal line, indicated by the x's 82 in FIG. 2. When the coordinate value stored in the counter module 26 has also been decremented to zero as explained earlier, the output signals from both counter modules will be high and the resultant signal produced by the OR-gate 30 will be low, thereby extinguishing the raster line at the exact cross-over point 58 of the cursor being produced. As the value in the counter module 26 is decremented below zero, the signal produced by the counter module 28 will again control and the electron beam of the cathode ray tube 32 will be reactivated causing the raster line to be drawn to the end of the line as indicated by the x's 82′ in FIG. 2. During horizontal retrace, the value present in the counter module 28 will be decremented below zero, and the signal produced by the module will again by low, thereby permitting the remaining portion of the cursor to be produced as indicated earlier. Upon reaching the end of the last raster line, the electron beam of the cathode ray tube 32 is repositioned to the upper left hand corner of the display area and the entire process is repeated.

Figure 4:
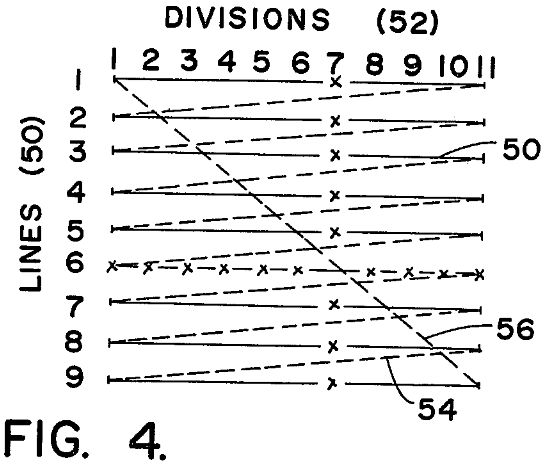
FIG. 4 is a simplified representation of a second raster-scan presentation of the cursor produced by the circuit of FIG. 1.

If the joy-stick 20 is now moved to a new position, for example one increment to the right and one increment down, the coordinate values initially stored in the counter modules 26 and 28 will be six and seven, respectively, and the cursor drawn on the faceplate of the cathode-ray tube 32 will be as shown in FIG. 4. In this case, the lines labeled XCNTR, OR(30)V, and OR(30)H in FIG. 3 are replaced by the lines labeled XCNTR′, OR(30)V′, and OR(30)H′. Otherwise, the operation of the circuit is as indicated above.

It is to be understood that while the circuit of the present invention is operating to produce the described cursor, other conventional circuitry is operating to produce any other information appearing in the same display presentation, and that while the electron beam producing the display is deactivated for cursor generating purposes, it may well be active to produce other parts of the display presentation.

In those situations where the rastor-scan presentation is displayed in an interlaced manner; that is, with two interlaced fields of N lines each being alternately presented on the faceplate of the cathode-ray tube 32 to form a single frame of 2 N lines, the least significant bit of the coordinate value stored in the register 24 is exclusively ORed at OR-gate 34 with an alternating field bit to produce a signal at the enable terminal (EN) of the counter module 28 that alternately enables and disables the counter module 28 to ensure that the horizontal portion of the cursor appears on only one line of each the two-field frame. The generation of the horizontal portion of the cursor once per frame ensures, in turn, that the cursor line will be only one line wide, rather than two lines wide as would be the case if it were drawn once per field. The field bit used to enable and disable the counter module 28 may be generated by any suitable conventional means.

Because the full-screen cross-hair cursor is generated once per field, or once per frame in an interlaced environment, the cursor appears to move at least as fast as the joy-stick 20 can be manipulated. Because of its large size and transparent cross-over point, it is also easy to locate and position without obscurring information lying thereunder.

The terms and expressions which have been employed in the foregoing specification are used therein as terms of description and limitation and there is no intention, in the use of such terms and expressions, of excluding equivalence of the features shown and described or portions thereof, it being recognized that the scope of the invention is defined and limited only by the claims which follow.

I claim as my invention:

1. A circuit for producing a full-screen cross-hair cursor in a display system including a display screen and means for producing a raster-scan image thereon, said circuit comprising:

(a) positional means for producing first and second digital signals representative respectively of first and second coordinate values of a desired location on said screen of a cursor to be produced;
(b) first counter means for receiving and selectively decrementing said first digital signal and for producing a first indication when said signal has been decremented to zero;
(c) second counter means for receiving and selectively decrementing said second signal and for producing a second indication when said signal has been decremented to zero; and
(d) means responsive to said first and second indications for producing an illuminated spot on the screen of said display system whenever either, but not both, of said digital signals have been decremented to zero.

2. The cursor producing circuit of claim 1 wherein said image produced by said display system is composed of a plurality of sequentially generated frames each of which is composed of a plurality of sequentially generated, mutually parallel raster-line segments divided into a plurality of equally spaced, sequentially occuring time divisions, and wherein said first counter means includes means for decrementing said first digital signal at a rate of one digital unit per said time division.

3. The cursor producing circuit of claim 2 wherein said second counter means includes means for decrementing said second digital signal at a rate of one digital unit per said line segment.

4. The cursor producing circuit of claim 2 wherein said first counter means includes means for receiving said first digital signal prior to the beginning of the production of each said line segment.

5. The cursor producing circuit of claim 3 wherein said second counter means includes means for receiving said second digital signal prior to the beginning of the production of each said frame.

6. The cursor producing circuit of claim 2 wherein the raster-line segments of every other said frame are interlaced with the raster-line segments of the immediately preceding said frame, and wherein said circuit further comprises means for disabling the operation of said second counter means during the production of every other said frame.

7. A method for producing a full-screen cross-hair cursor in a display system including a display screen and means for producing a raster-scan image thereon, said method comprising the steps of:

(a) producing first and second digital signals representative respectfully of first and second coordinate of a desired location on said screen of a cursor to be produced;
(b) receiving and selectively decrementing said first digital signal and producing a first indication when said signal has been decremented to zero;
(c) receiving and selectively decrementing said second digital signal and producing a second indication when said signal has been decremented to zero; and (d) producing an illuminated spot on the screen of said display system whenever either, but not both, of said digital signals have been decremented to zero.

8. The cursor producing method of claim 7 wherein said image produced by said display system is composed of a plurality of sequentially generated frames each of which is composed of a plurality of sequentially generated, mutually parallel raster-line segments divided into a plurality of equally spaced sequentially occuring time divisions, and wherein said step (b) includes the step of decrementing said first digital signal at a rate of one digital unit per said time division.

9. The cursor producing method of claim 8 wherein said step (c) includes the step of decrementing said second digital signal at a rate of one digital unit per line segment.

10. The cursor producing method of claim 8 wherein said step (b) includes the step of receiving said first digital signal prior to the beginning of each said line segment.

11. The cursor producing method of claim 9 wherein said step (c) includes the step of receiving said second digital signal prior to the beginning of the production of each frame.

12. The cursor producing method of claim 8 wherein the raster-line segments of every other said frame are interlaced with the raster-line segments of the immediately preceding said frame, and wherein said step (c) includes decrementing said second digital signal only during the production of every other said frame.

* * * * *